United States Patent
Kwak et al.

(10) Patent No.: US 8,145,014 B2
(45) Date of Patent: Mar. 27, 2012

(54) APPARATUS AND METHOD OF REMOVING COLOR NOISE OF DIGITAL IMAGE

(75) Inventors: Boo Dong Kwak, Gyunggi-Do (KR); Bong Soon Kang, Busan (KR); Joo Young Ha, Gyungsangnam (KR); Sung Mok Lee, Busan (KR); Won Woo Jang, Busan (KR); Won Tae Choi, Gyunggi-Do (KR); Joo Hyun Kim, Gyunggi-Do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 901 days.

(21) Appl. No.: 12/188,771

(22) Filed: Aug. 8, 2008

(65) Prior Publication Data

US 2009/0136127 A1    May 28, 2009

(30) Foreign Application Priority Data

Nov. 27, 2007    (KR) .................. 10-2007-0121691

(51) Int. Cl.
  *G06K 9/32*    (2006.01)
(52) U.S. Cl. ........ 382/300; 250/226; 348/234; 348/246; 348/311; 358/1.9; 358/474; 382/275
(58) Field of Classification Search .............. None
  See application file for complete search history.

(56) References Cited

U.S. PATENT DOCUMENTS

| | | | | |
|---|---|---|---|---|
| 5,136,401 A * | 8/1992 | Yamamoto et al. | ........... | 358/474 |
| 6,295,087 B1 * | 9/2001 | Nohda | ........... | 348/234 |
| 6,667,815 B1 * | 12/2003 | Nagao | ........... | 358/1.9 |
| 2002/0034337 A1 * | 3/2002 | Shekter | ........... | 382/275 |
| 2006/0055801 A1 * | 3/2006 | Matsumoto | ........... | 348/311 |
| 2007/0272836 A1 * | 11/2007 | Higashitsutsumi et al. | .. | 250/226 |
| 2008/0094491 A1 * | 4/2008 | Hsu et al. | ........... | 348/246 |

* cited by examiner

*Primary Examiner* — Anand Bhatnagar
*Assistant Examiner* — Tsung-Yin Tsai
(74) *Attorney, Agent, or Firm* — Lowe, Hauptman, Ham & Berner, LLP (57) ABSTRACT

There is provided an apparatus for removing color noise including: a color interpolation unit performing color interpolation on a bayer pattern image output from an image sensor; a high-pass filter unit performing high-pass filtering on each of the pixels of the bayer pattern image to generate high-pass filtered values of each of the pixels; a high frequency region determining unit comparing pixel values of a target pixel, from which color noise is removed, and pixels adjacent to the target pixel with the high-pass filtered values to determine whether the target pixel is included in a high frequency region; and a color noise region determining unit using differences between color values of the target pixel interpolated by the color interpolation unit and determining whether the target pixel is included in a color noise region when it is determined that the target pixel is included in the high frequency region.

12 Claims, 8 Drawing Sheets

FIG. 1

| G11 | R12 | G13 | R14 | G15 |
|---|---|---|---|---|
| B21 | G22 | B23 | G24 | B25 |
| G31 | R32 | G33 | R34 | G35 |
| B41 | G42 | B43 | G44 | B45 |
| G51 | R52 | G53 | R54 | G55 |

FIG. 2A

| R11 | G12 | R13 | G14 | R15 |
|---|---|---|---|---|
| G21 | B22 | G23 | B24 | G25 |
| R31 | G32 | R33 | G34 | R35 |
| G41 | B42 | G43 | B44 | G45 |
| R51 | G52 | R53 | G54 | R55 |

FIG. 2B

| G11 | B12 | G13 | B14 | G15 |
|---|---|---|---|---|
| R21 | G22 | R23 | G24 | R25 |
| G31 | B32 | G33 | B34 | G35 |
| R41 | G42 | R43 | G44 | R45 |
| G51 | B52 | G53 | B54 | G55 |

FIG. 2C

| B11 | G12 | B13 | G14 | B15 |
|---|---|---|---|---|
| G21 | R22 | G23 | R24 | G25 |
| B31 | G32 | B33 | G34 | B35 |
| G41 | R42 | G43 | R44 | G45 |
| B51 | G52 | B53 | G54 | B55 |

FIG. 2D

| G11 | R12 | G13 | R14 | G15 |
|-----|-----|-----|-----|-----|
| B21 | G22 | B23 | G24 | B25 |
| G31 | R32 | G33 | R34 | G35 |
| B41 | G42 | B43 | G44 | B45 |
| G51 | R52 | G53 | R54 | G55 |

| G11 | R12 | G13 | R14 | G15 |
|-----|-----|-----|-----|-----|
| B21 | G22 | B23 | G24 | B25 |
| G31 | R32 | G33 | R34 | G35 |
| B41 | G42 | B43 | G44 | B45 |
| G51 | R52 | G53 | R54 | G55 |

APPARATUS AND METHOD OF REMOVING COLOR NOISE OF DIGITAL IMAGE

CROSS-REFERENCE TO RELATED APPLICATIONS

This application claims the priority of Korean Patent Application No. 2007-0121691 filed on Nov. 27, 2007, in the Korean Intellectual Property Office, the disclosure of which is incorporated herein by reference.

BACKGROUND OF THE INVENTION

1. Field of the Invention

The present invention relates to an apparatus and method of removing color noise of a digital image, and more particularly, to an apparatus and method of removing color noise of a digital image that can remove color noise occurring in a high frequency region of a digital image independent of a color interpolation method by determining the high frequency region in a bayer image output from an image sensor, determining whether the high frequency region is a region in which color noise is generated, and correcting the region having the color noise in an RGB image subject to color interpolation (or color demosaicking).

2. Description of the Related Art

In general, each pixel of an image sensor that is used, for example, in a digital camera uses a color filter and detects one color among red, green, and blue (RGB). The image sensor, therefore, outputs a bayer pattern image. In the image output from the image sensor, color values may be determined during color processing in addition to a color value of the color detected by each of the pixels. As such, the image processing by which color values of the respective pixels of the image output from the image sensor is called color interpolation or color demosaicking.

When the color interpolation is performed on the bayer pattern image, color noise may occur in a high frequency region, such as the contour of a subject and the boundary of a pattern. In general, an image processing algorithm for color interpolation has been developed to suppress color noise as much as possible in consideration of the generation of color noise. That is, the color interpolation algorithm includes not only color interpolation but also a scheme of suppressing the generation of color noise.

Therefore, when a new color interpolation scheme is used in order to improve the color interpolation, the color interpolation and color noise suppression according to the related art need to be performed in consideration of color noise suppression as well as color interpolation. Further, in order to improve the color noise suppression, the entire color interpolation algorithm needs to be newly developed.

SUMMARY OF THE INVENTION

An aspect of the present invention provides an apparatus and method of removing color noise of a digital image that determines whether color noise occurs in a bayer pattern image output from an image sensor independent of a color interpolation algorithm and performs correction on an interpolated image in order to remove color noise of the image.

According to an aspect of the present invention, there is provided an apparatus for removing color noise including: a color interpolation unit performing color interpolation on a bayer pattern image output from an image sensor to determine color values of respective pixels; a high-pass filter unit performing high-pass filtering on each of the pixels of the bayer pattern image in a horizontal direction and a vertical direction to generate a horizontal high-pass filtered value of each of the pixels of the bayer pattern image and a vertical high-pass filtered value of each of the pixels of the bayer pattern image; a high frequency region determining unit comparing pixel values of a target pixel, from which color noise is removed, and pixels adjacent to the target pixel with the horizontal and vertical high-pass filtered values to determine whether the target pixel is included in a high frequency region; a color noise region determining unit using differences between color values of the target pixel interpolated by the color interpolation unit and determining whether the target pixel is included in a color noise region when it is determined that the target pixel is included in the high frequency region; and a color noise removing unit replacing a color value and a blue value of the target pixel with a green value of the target pixel when it is determined that the target pixel is included in the color noise region.

The high-pass filter unit may include: a horizontal high-pass filter unit applying a horizontal mask having a high-pass filtering coefficient to pixels arranged horizontally with respect to each of the pixels of the bayer pattern image to generate the horizontal high-pass filtered value of each of the pixels of the bayer pattern image; and a vertical high-pass filter unit applying a vertical mask having a high-pass filtering coefficient to pixels arranged vertically with respect to each of the pixels of the bayer pattern image to generate the vertical high-pass filtered value of each of the pixels of the bayer pattern image.

The horizontal high-pass filter unit may determine an average of green pixels vertically adjacent to each of red and blue pixels of the bayer pattern image as a first estimated green value of each of the red and blue pixels of the bayer pattern image and generates the horizontal high-pass filtered value by using a green value of each of the pixels of the bayer pattern image and the first estimated green value, and the vertical high-pass filter unit may determine an average of green pixels horizontally adjacent to each of the red and blue pixels of the bayer pattern image as a second estimated green value and generates the vertical high-pass filtered value by using the green value of each of the pixels of the bayer pattern image and the second estimated green value.

The high frequency region determining unit may include: an error value calculating unit obtaining first and second error values by subtracting the horizontal high-pass filtered value of a left neighboring pixel of the target pixel and the horizontal high-pass filtered value of a right neighboring pixel of the target value from pixel values of the left and right neighboring pixels, respectively, of the target value and obtaining third and fourth error values by subtracting the vertical high-pass filtered value of an upper neighboring pixel of the target pixel and the vertical high-pass filtered value of a lower neighboring pixel of the target value from pixel values of the upper and lower neighboring pixels of the target value, respectively; a horizontal high frequency region determining unit determining that the target pixel is included in the high frequency region when the first error value is positive and the second error value is negative, pixel values of pixels included in the horizontal mask with respect to the left neighboring pixel of the target pixel are all larger than the horizontal high-pass filtered value of the left neighboring pixel, and pixel values of pixels included in the horizontal mask with respect to the right neighboring pixel of the target pixel are all smaller than the horizontal high-pass filtered value of the right neighboring pixel, the horizontal high frequency region determining that the target pixel is included in the high frequency region when the first error value is negative and the second error value is positive, all of the pixel values of the pixels included in the horizontal mask with respect to the left neighboring pixel of the target pixel are smaller than the horizontal high-pass filtered value of the left neighboring pixel, and all of the pixel values of the pixels included in the horizontal mask with respect to the right neighboring pixel of the target pixel are larger than the horizontal high-pass filtered value of the right neighboring pixel, the horizontal high frequency region determining that the target pixel is included in the high frequency region when all of the first and second error values are positive or negative and all of the pixel values of the pixels included in the horizontal mask with respect to the target pixel are smaller or larger than the horizontal high-pass filtered value of the target pixel; and a vertical high frequency region determining unit determining that the target pixel is included in the high frequency region when the third error value is positive and the fourth error value is negative, all of the pixel values of the pixels included in the vertical mask with respect to the upper neighboring pixel of the target pixel are larger than the vertical high-pass filtered value of the upper neighboring pixel, all of the pixel values of the pixels included in the vertical mask with respect to the lower neighboring pixel of the target pixel are smaller than the vertical high-pass filtered value of the lower neighboring pixel, the vertical high frequency region determining that the target pixel is included in the high frequency region when the third error value is negative and the fourth error value is positive, all of the pixel values of the pixels included in the vertical mask with respect to the upper neighboring pixel of the target pixel are smaller than the vertical high-pass filtered value of the upper neighboring pixel, and all of the pixel values of the pixels included in the vertical mask with respect to the lower neighboring pixel of the target pixel are larger than the vertical high-pass filtered value of the lower neighboring pixel, the vertical high frequency region determining that the target pixel is included in the high frequency region when all of the third and fourth error values are positive or negative and all of the pixel values of pixels included in the vertical mask with respect to the target pixel are smaller or larger than the vertical high-pass filtered value of the target pixel.

For the pixel values used by the error value calculating unit to calculate the first and second error values and the pixel values used by the horizontal high frequency determining unit to determine the high frequency region, green values of the green pixels may be applied to the green pixels of the bayer pattern image and the average of the green pixels vertically adjacent to each of the red and blue pixels of the bayer pattern image may be applied to each of the red and blue pixels.

For the pixel values used by the error value calculating unit to calculate the third and fourth error values and the pixel values used by the vertical high frequency determining unit to determine the high frequency region, the green values of the green pixels may be applied to the green pixels of the bayer pattern image and the average of the green pixels horizontally adjacent to each of the red and blue pixels may be applied to each of the red and blue pixels of the bayer pattern image.

The color noise region determining unit may determine that the corresponding pixel is included in the color noise region when a difference between the green value and the blue value and a difference between the green value and the red value among the color values generated by causing the color interpolation unit to perform color interpolation on the pixel determined by the high frequency region determining unit that it is included in the high frequency region are smaller than a predetermined color noise determination threshold value.

According to another aspect of the present invention, there is provided a method of removing color noise in a digital image, the method including: performing color interpolation on a bayer pattern image output from an image sensor to determine color values of respective pixels; performing high-pass filtering on each of the pixels of the bayer pattern image in a horizontal direction and a vertical direction to generate a horizontal high-pass filtered value of each of the pixels of the bayer pattern image and a vertical high-pass filtered value of each of the pixels of the bayer pattern image; comparing pixel values of a target pixel, from which color noise is removed, and pixels adjacent to the target pixel and determining whether the target pixel is included in a high frequency region; using differences between the color values of the target pixel interpolated by the color interpolation unit and determining whether the target pixel is included in a color noise region when it is determined that the target pixel is included in the high frequency region; and replacing a red value and a blue value of the target pixel with a green value of the target pixel when it is determined that the target pixel is included in a color noise region.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. Therefore, in the accompanying drawings, shapes and sizes of elements may be exaggerated for clarifying of the present invention.

Figure 1:
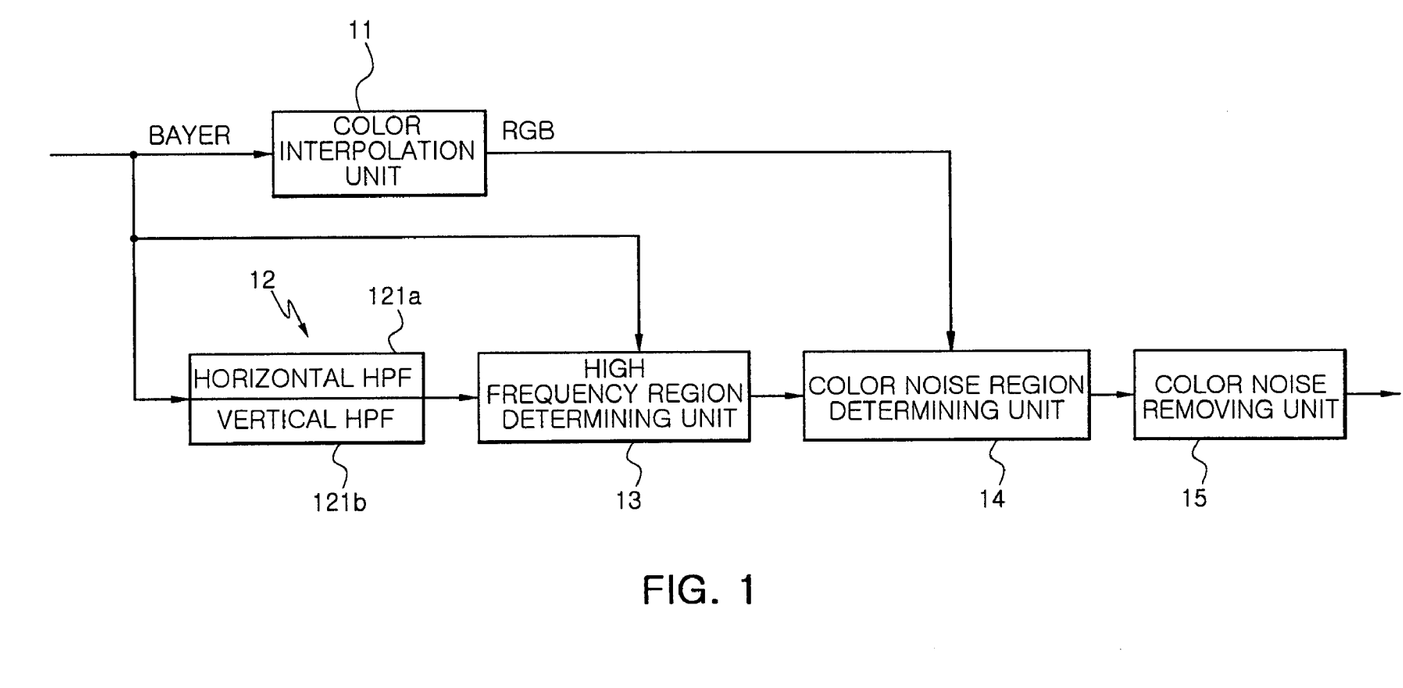
FIG. 1 is a block diagram illustrating a configuration of an apparatus for removing color noise according to an exemplary embodiment of the present invention.
Figure 2A:
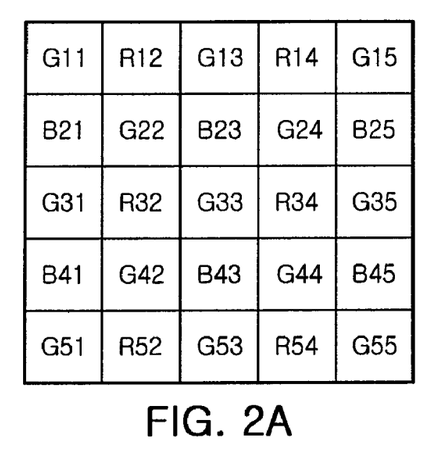
FIGS. 2A to 2D is a diagram illustrating a portion of a bayer pattern image output from an image sensor.
Figure 2B:
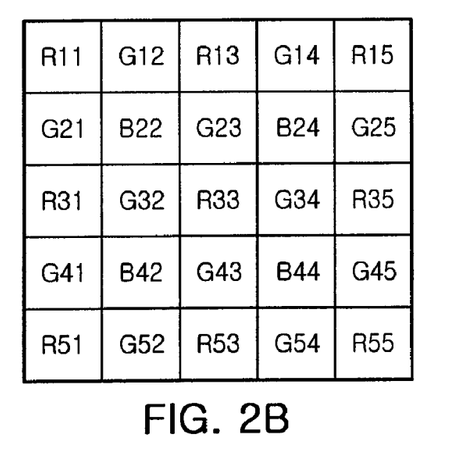
Figure 2C:
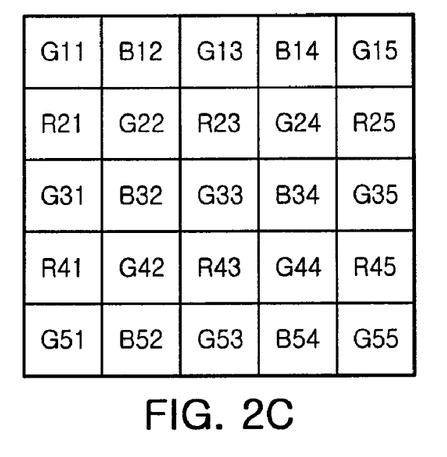
Figure 2D:
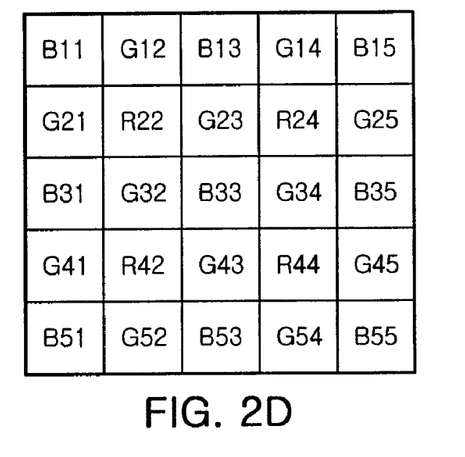

FIG. 1 is a block diagram illustrating a configuration of an apparatus for removing color noise according to an exemplary embodiment of the invention. Referring to FIG. 1, the apparatus for removing color noise according to the exemplary embodiment of the invention includes a color interpolation unit 11, a high-pass filter unit 12, a high frequency region determining unit 13, a color noise region determining unit 14, and a color noise removing unit 15. The color interpolation unit 11 performs color interpolation of a bayer pattern image that is output from an image sensor to determine color values of respective pixels. The high-pass filter unit 12 performs high-pass filtering of the respective pixels of the bayer pattern image in horizontal and vertical directions to generate horizontal high-pass filtered values of the respective pixels of the bayer pattern image and vertical high-pass filtered values of the respective pixels of the bayer pattern image. The high frequency region determining unit 13 compares pixel values of a target pixel from which color noise is removed and pixel values of pixels adjacent to the target pixel with each of the horizontal and vertical high-pass filtered values to determine whether the target pixel is included in a high frequency region. When it is determined that the target pixel is included in the high frequency region, the color noise region determining unit 14 uses differences between color values of the target pixel interpolated by the color interpolation unit to determine whether the target pixel is included in a color noise region. When it is determined that the target pixel is included in the color noise region, the color noise removing unit 15 replaces a red value and a blue value that the target pixel with a green value of the target pixel.

FIGS. 2A to 2D is a diagram illustrating a portion of a bayer pattern image output from an image sensor. The bayer pattern image, shown in FIGS. 2A to 2D, is formed in which each pixel of the image sensor detects one color among red, green, and blue by using a color filter that is disposed at a front surface of the image sensor. The color interpolation unit 11 receives the bayer pattern image, shown in FIGS. 2A-2D, from the image sensor and determines red, green and blue color values of each of the pixels. All of the known color interpolation algorithms can be applied to the color interpolation unit 11 according to the embodiment of the invention. Any color interpolation algorithm that may be developed in the future can be applied to the color interpolation unit 11. The invention is to remove color noise from the image interpolated by the color interpolation unit 11. In order not to obscure the spirit of the invention, the detailed description of the color interpolation algorithm will not be made any more.

Figure 3A:
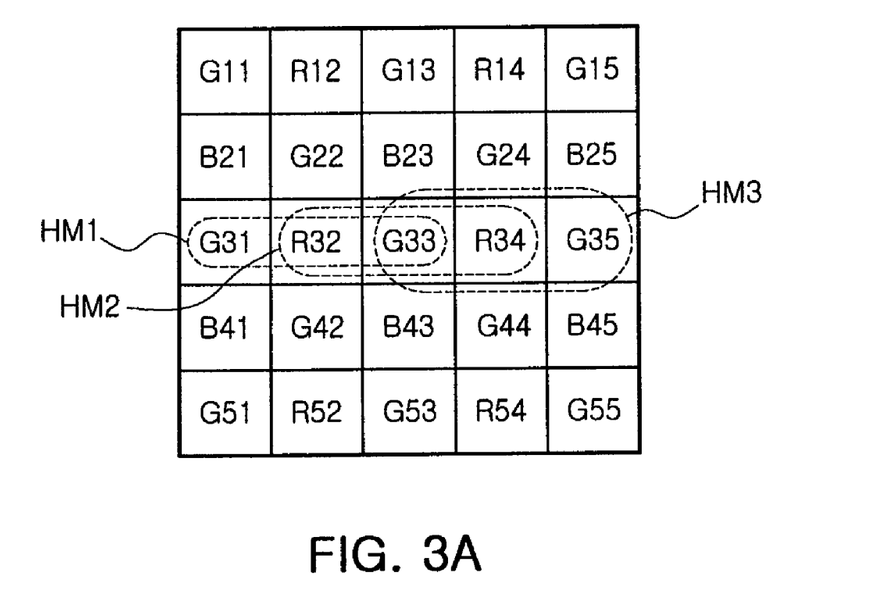
FIGS. 3A and 3B is a diagram illustrating an example of high-pass filtering that is applied to the present invention.
Figure 3B:
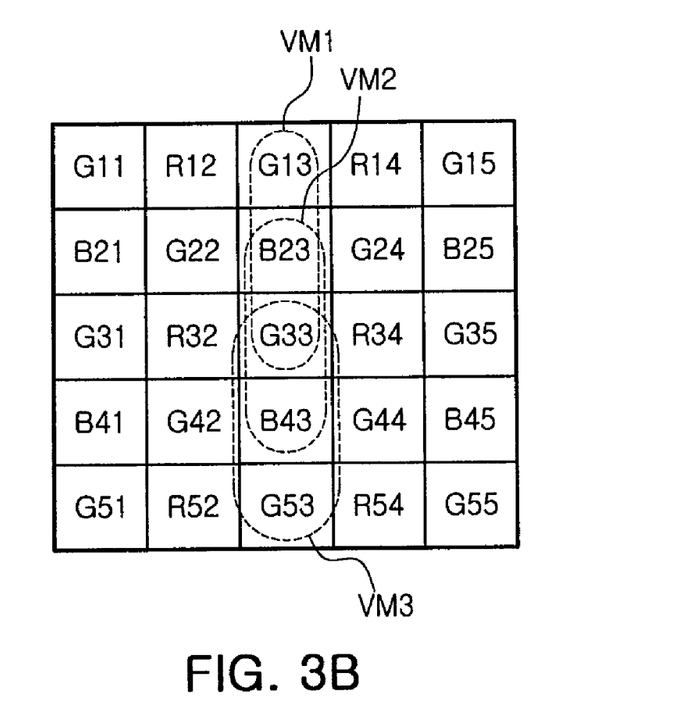

FIGS. 3A and 3B is a diagram illustrating an example of a high-pass filtering operation that is applied to the embodiment of the invention.

The high-pass filter unit 12 according to the embodiment of the invention performs high-pass filtering on each of the pixels of the bayer pattern image output from the image sensor along the horizontal direction and the vertical direction to generate the horizontal high-pass filtered value and the vertical high-pass filtered value of each of the pixels of the bayer patter image. To this end, the high-pass filter unit 12 may include a horizontal high-pass filter unit 121a and a vertical high-pass filter unit 121b. As shown in FIG. 3A, the horizontal high-pass filter unit 121a applies horizontal masks HM1 to HM3 having high-pass filter coefficients to pixels that are arranged horizontally with respect to the respective pixels of the bayer pattern image to generate horizontal high-pass filtered values of the respective pixels of the bayer pattern image. As shown in FIG. 3B, the vertical high-pass filter unit 121b applies vertical masks VM1 to VM3 having high-pass filter coefficients to pixels that are arranged vertically with respect to the respective pixels of the bayer patter image to generate vertical high-pass band filtered values of the respective pixels of the bayer pattern image.

Figure 4:
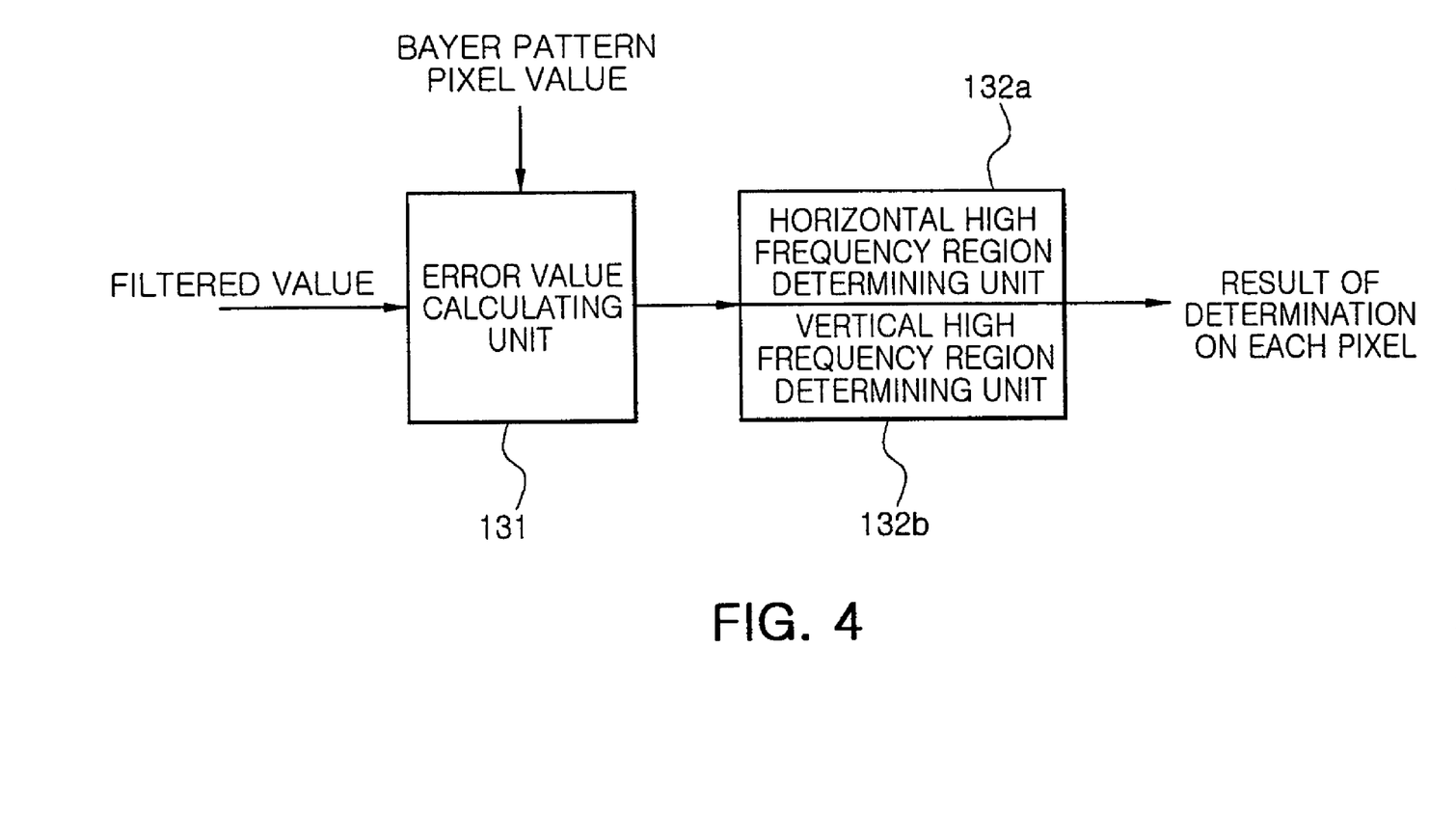
FIG. 4 is a block diagram illustrating a detailed configuration of a color noise region determining unit according to an exemplary embodiment of the present invention.

FIG. 4 is a block diagram illustrating a detailed configuration of the color noise region determining unit 14 according to the exemplary embodiment of the present invention. Referring to FIG. 4, the color noise region determining unit 14 may include an error value calculating unit 131, a horizontal high frequency region determining unit 132a, and a vertical high frequency region determining unit 132b. The error value calculating unit 131 generates error values obtained by comparing the horizontal and vertical high-pass filtered values output from the high-pass filter unit 12 with the pixel values of the bayer pattern image. The horizontal high frequency region determining unit 132a and the vertical high frequency region determining unit 132b determine whether the target pixel is included in the high-frequency region according to conditions of the error values output from the error value calculating unit 131 and a result of comparison between values of the target pixel, which is determined whether it is included in the noise region or not, and pixels adjacent to the target pixel, and the high-pass filtered values.

Specifically, the error value calculating unit 131 calculates first and second error values obtained by subtracting the horizontal high-pass filtered value of a left neighboring pixel and the horizontal high-pass filtered value of a right neighboring pixel from pixel values of the left and right neighboring pixels of the target pixel, respectively, determined whether it is included in the high frequency region. Further, the error calculating unit 131 calculates third and fourth error values obtained by subtracting the vertical high-pass filtered value of an upper neighboring pixel and the vertical high-pass filtered value of a lower neighboring pixel from pixel values of the upper and lower pixels of the target value, respectively.

The horizontal high frequency region determining unit 132a determines that the target pixel is included in the high frequency region when the first error value is positive and the second error value is negative, pixel values of pixels included in the horizontal mask with respect to the left neighboring pixel are all larger than the horizontal high-pass filtered value of the left neighboring pixel, and pixel values of pixels included in the horizontal mask with respect to the right neighboring pixel are all smaller than the horizontal high-pass filtered value of the right neighboring pixel. Further, the horizontal high frequency region determining unit 132a determines that the target pixel is included in the high frequency region when the first error value is negative and the second error value is positive, all of the pixel values of the pixels included in the horizontal mask with respect to the left neighboring pixel of the target pixel are smaller than the horizontal high-pass filtered value of the left neighboring pixel, and all of the pixel values of the pixels included in the horizontal mask with respect to the right neighboring pixel of the target pixel are larger the horizontal high-pass filtered value of the right neighboring pixel. Further, the horizontal high frequency region determining unit 132a determines that the target pixel is included in the high frequency region when all of the first and second error values are positive or negative, and all of the pixel values of the pixels included in the horizontal mask with respect to the target pixel are smaller or larger than the horizontal high-pass filtered value of the target pixel.

The vertical high frequency region determining unit 132b determines that the target pixel is included in the high frequency region when the third error value is positive and the fourth error value is negative, pixel values of pixels included in the vertical mask with respect to the upper neighboring pixel of the target pixel are all larger than the vertical high-pass filtered value of the upper neighboring pixel, and pixel values of pixels included in the vertical mask with respect to the lower neighboring pixel of the target pixel are all smaller than the vertical high-pass filtered value of the lower neighboring pixel. The vertical high frequency region determining unit 132b determines that the target pixel is included in the high frequency region when the third error value is negative, the fourth value is positive, all of the pixel values of the pixels included in the vertical mask with respect to the upper neighboring pixel of the target pixel are smaller than the vertical high-pass filtered value of the upper neighbor pixel, and all of the pixel values of the pixels included in the vertical mask with respect to the lower neighboring pixel of the target pixel are larger than the vertical high-pass filtered value. Further, the vertical high frequency region determining unit 132b determines that the target pixel is included in the high frequency region when all of the third and fourth error values are positive or negative and all of the pixel values of the pixels included in the vertical mask with respect to the target pixel are smaller or larger than the vertical high-pass filtered value of the target pixel.

The color noise removing unit 15 according to the embodiment of the invention replaces a red value and a blue value among color values generated as a result of performing color interpolation on the corresponding pixel that is determined that it is included in the color noise region by the color noise region determining unit 14 with the green value that the pixel has. That is, since the red, green, and blue values of the pixel determined by the color noise removing unit 15 that it is included in the color noise region have the same values, the pixel is changed into an achromatic color pixel, thereby removing color noise.

As described above, the apparatus for removing color noise according to the embodiment of the invention, a green value may be preferably used as a pixel value of the bayer pattern image that is applied when calculating the high-pass filtered value, calculating the error values, and determining the high frequency region. This is why the green value contains image information of a larger wavelength band than the red value or the color value. In the bayer pattern image, the pixel that appears green may directly use its pixel value for the calculation since the pixel value of the green pixel is a green value. However, since the green and blue pixels have green and blue pixel values, pixels that appear red and blue may each use a green value of a green pixel adjacent to each of the green and blue pixel values to calculate an estimated green value.

For example, the horizontal high-pass filter unit 121a may determine an average of green pixels vertically adjacent to each of the red and blue pixels of the bayer pattern image as a first estimated green value of each of the red and blue pixels and then, generate the horizontal high-pass filtered values by using the green value of each of the pixels of the bayer pattern image and the first estimated green value. Further, the vertical high-pass filter unit 121b may determine an average of green pixels horizontally adjacent to each of the green and blue pixels of the bayer pattern image as a second estimated green value of each of the red and blue pixels, and then generate the vertical high-pass filtered values by using the green value of each of the pixels of the bayer pattern and the second estimated green value.

Similarly, for the pixel values used by the error value calculating unit 131 when calculating the first and second error values and the pixel values used by the horizontal high frequency region determining unit to determine t whether the target pixel is included in the high frequency region, the green value of the green pixel of the bayer pattern image is applied to the green pixel, and an average of green pixels vertically adjacent to each of the red and blue pixels may be applied to each of the red and blue pixels of the bayer pattern image. Further, for the pixel values applied when the error value calculating unit 131 calculates the third and fourth error values and the pixel values used when the vertical high frequency region determining unit determines whether the target pixel is a high frequency region, the green value of the green pixel of the bayer pattern image is applied to the green pixel, and an average of the green pixels horizontally adjacent to each of the red and blue pixels may be applied to each of the red and blue pixels.

Figure 5:
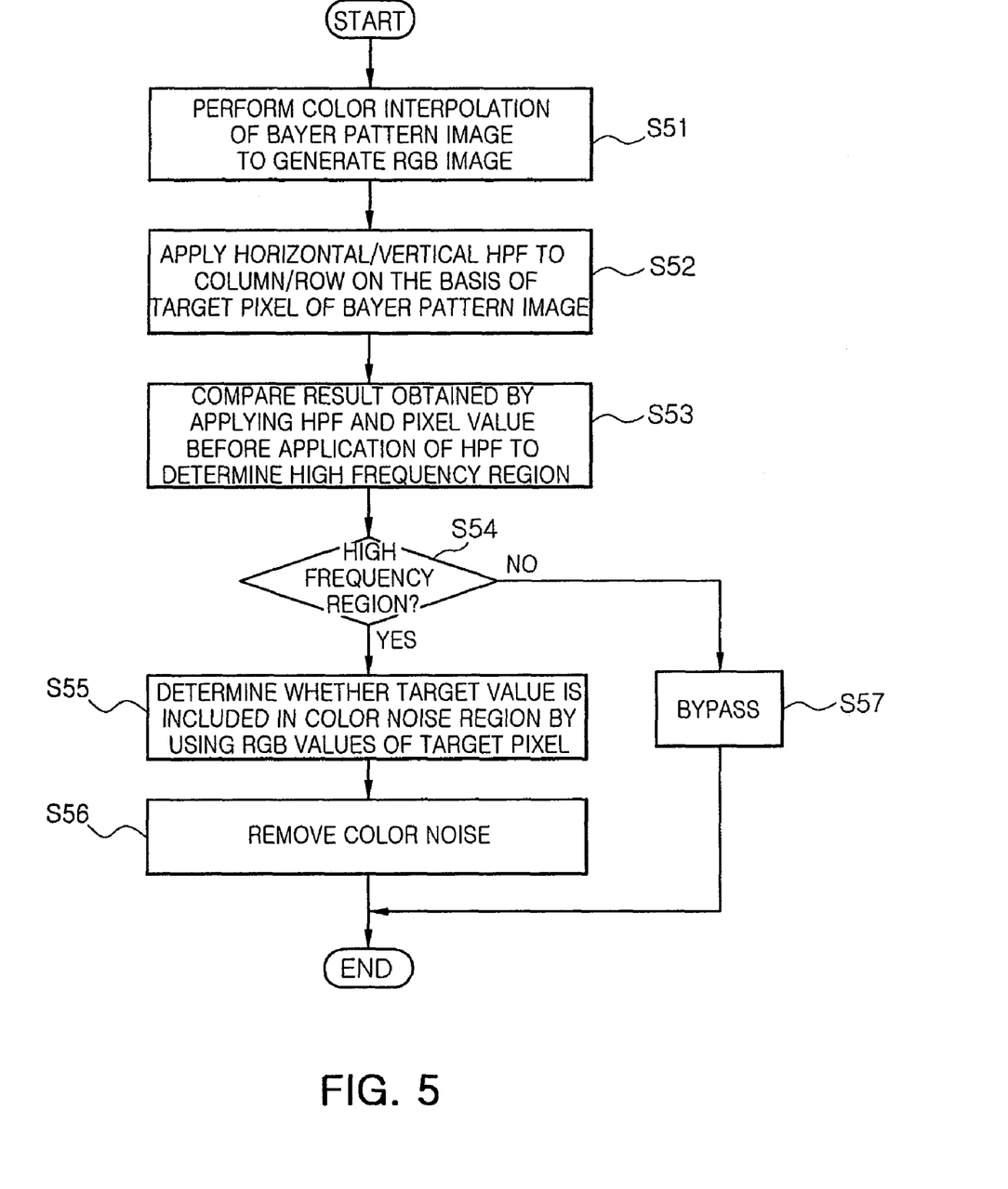
FIG. 5 is a flowchart illustrating a method of removing color noise according to another exemplary embodiment of the present invention.
Figure 6:
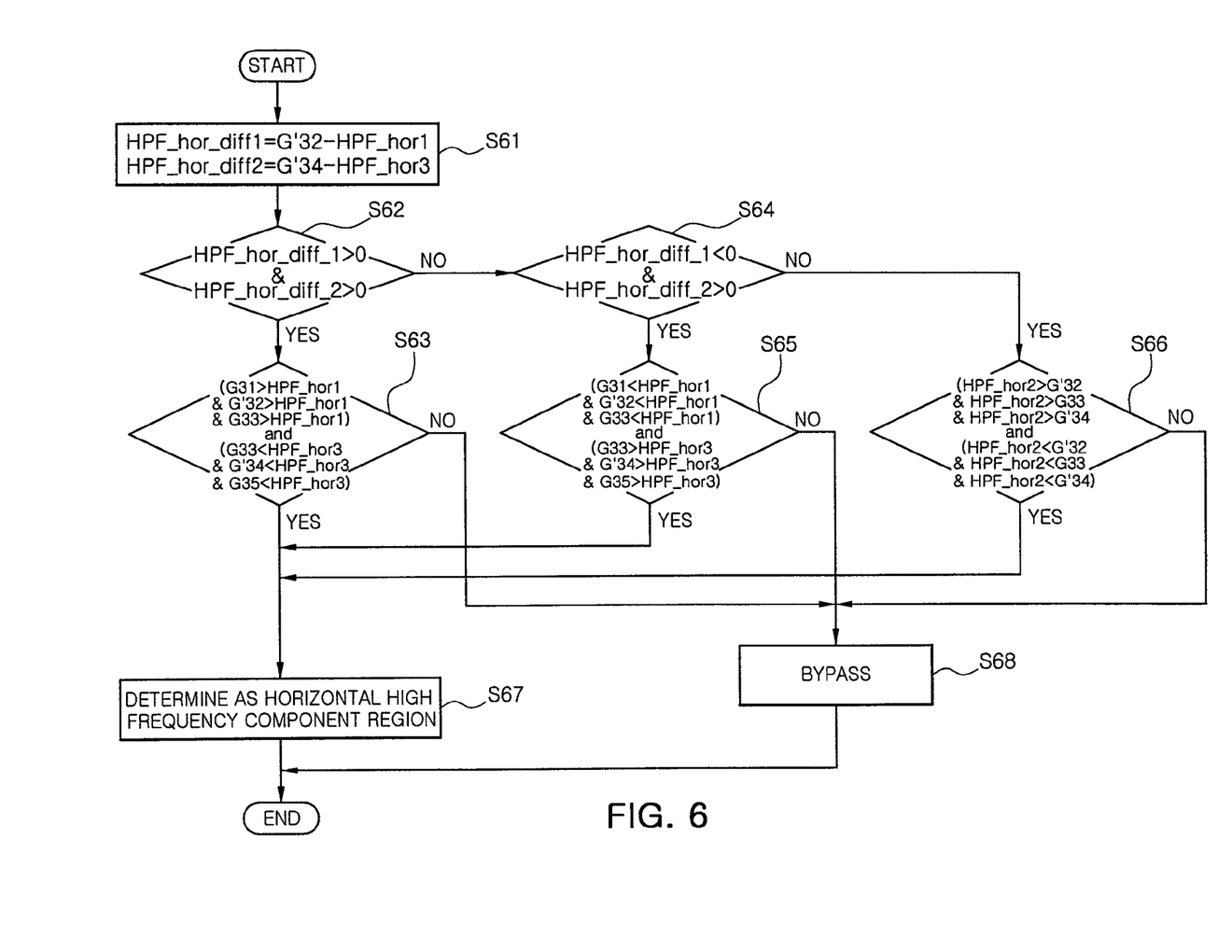
FIG. 6 is a flowchart illustrating a horizontal high frequency region determining operation according to the exemplary embodiment of the present invention.
Figure 7:
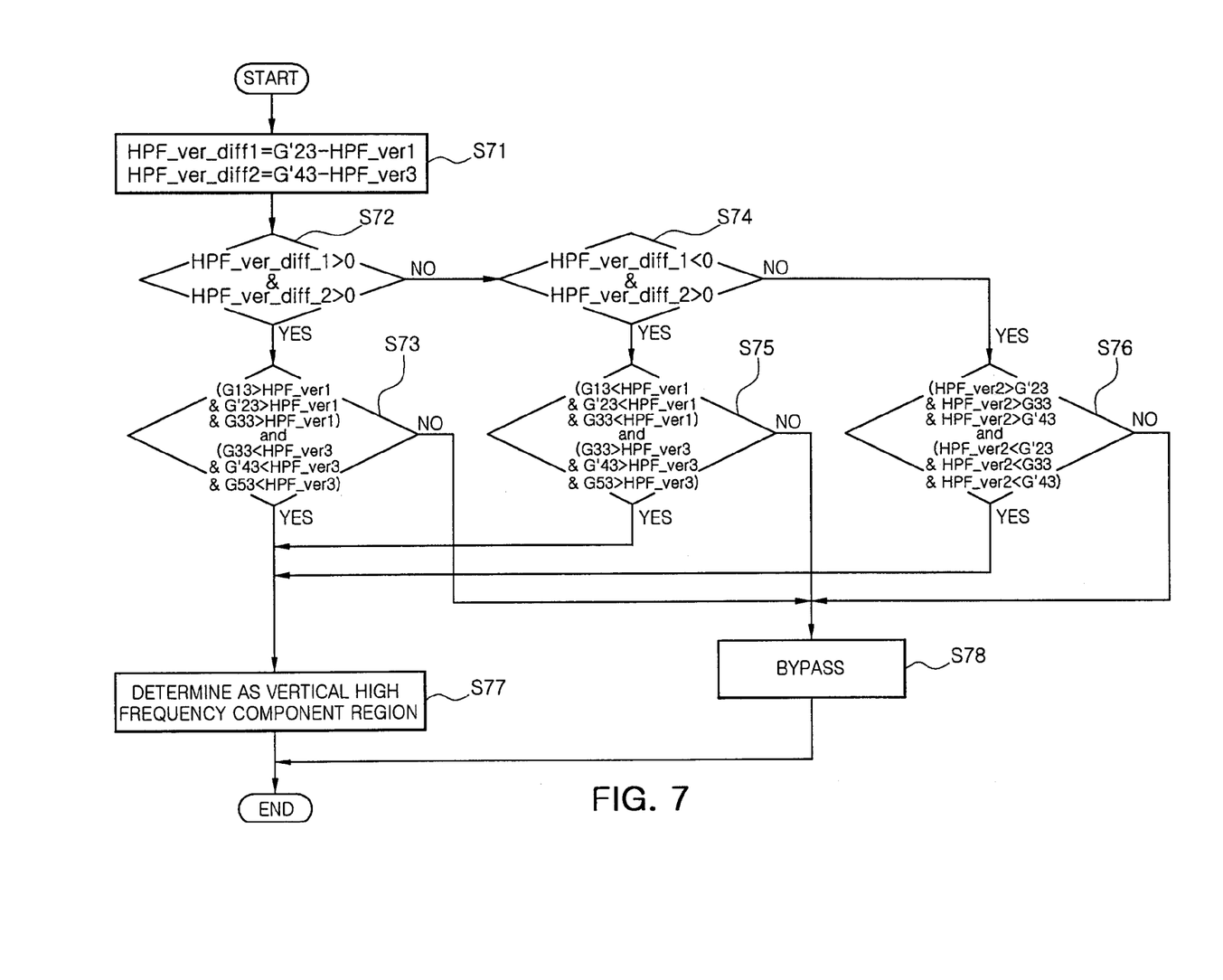
FIG. 7 is a flowchart illustrating a vertical high frequency region determining operation according to the exemplary embodiment of the present invention.
Figure 8:
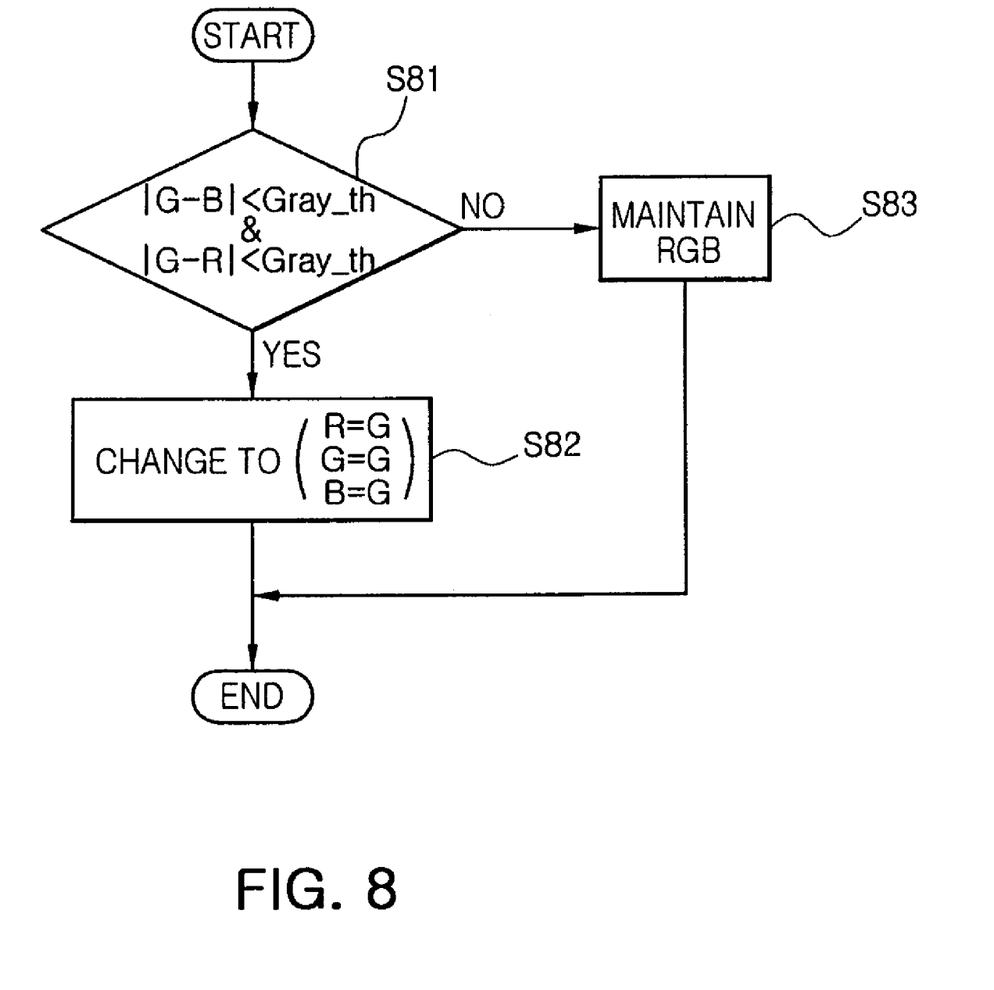
FIG. 8 is a flowchart illustrating an operation of determining whether a target pixel is included in a color noise region according to an exemplary embodiment of the present invention.

FIG. 5 is a flowchart illustrating a method of removing color noise according to another exemplary embodiment of the present invention. FIG. 6 is a flowchart illustrating an operation of determining a horizontal high frequency region according to the exemplary embodiment of the present invention. FIG. 7 is a flowchart illustrating an operation of determining a vertical high frequency region according to the exemplary embodiment of the present invention. FIG. 8 is a flowchart illustrating an operation of determining whether a target pixel is included in a color noise region according to the exemplary embodiment of the present invention.

Hereinafter, a method of removing color noise according to another exemplary embodiment of the invention and the operation of the invention will be described in more detail with reference to the accompanying drawings.

First, referring to FIG. 5, the method of removing color noise according to the exemplary embodiment of the invention may start from a color interpolation operation (S51) of performing color interpolation on a bayer pattern image output from an image sensor to determine color values of respective pixels. The color interpolation operation (S51) may be performed by the color interpolation unit 11. As described above, the image output by the image sensor is a bayer pattern image as shown in FIGS. 2A to 2D. During the color interpolation operation (S51), the color interpolation unit 11 receives the bayer pattern image, as shown in FIGS. 2A to 2D, from the image sensor and determines red, green, and blue values of each of the pixels. All of the known color interpolation algorithms may be applied to the color interpolation operation (S51) according to the embodiment of the invention. Any color interpolation algorithm that may be developed in the future may be applied to the color interpolation operation (S51).

Then, separate from the color interpolation operation (S51), a high-pass filtering operation (S52) of performing high-pass filtering of each of the pixels of the bayer pattern image output from the image sensor in a horizontal direction and a vertical direction is performed to generate horizontal high-pass filtered values with respect to the respective pixels of the bayer pattern image and vertical high-pass filtered values with respect to the respective pixels of the bayer pattern image. The high-pass filtering operation (S52) may be performed by the high-pass filter unit 12 shown in FIG. 1.

The high-pass filtering operation (S52) may include an operation of generating horizontal high-pass filtered values with respect to the respective pixels of the bayer pattern image by applying horizontal masks having high-pass filter coefficients to pixels arranged horizontally with respect to the respective pixels of the bayer pattern image and an operation of generating vertical high-pass filtered values with respect to the respective pixels of the bayer pattern image by applying vertical masks having high-pass filter coefficients to pixels arranged vertically with respect to the respective pixels of the bayer pattern image. The operation of generating the horizontal high-pass filtered values and the operation of generating the vertical high-pass filtered values may be performed by the horizontal high-pass filter unit 121*a* and the vertical high-pass filter unit 121*b*, respectively, as shown in FIG. 1.

In FIG. 3A, regions HM1 to HM3 to which three horizontal masks are applied are shown. In FIG. 3B, regions VM1 to VM3 to which three vertical masks are applied are shown. FIG. 3A shows an example in which each of the horizontal masks has a size of 1×3. However, the horizontal mask may have different sizes. In the same manner, each of the vertical masks may have different sizes. Further, FIGS. 3A and 3B show examples of bayer pattern images shown in FIG. 2A. In the following description, this is to show an example in which a pixel G33 to be determined whether it is included in a color noise region is a green pixel, pixels R32 and R34 vertically adjacent to this target pixel are red pixels, and pixels B23 and B43 vertically adjacent to the target pixel are blue pixels. The same can be applied to a bayer pattern image in a different form. The present invention is not limited to the examples shown in FIGS. 3A and 3B.

A mask used to obtain a horizontal high-pass filtered value with respect to the pixel R32 is applied to the region HM1 among the regions to which the horizontal masks are applied as shown in FIG. 3A. Further, a mask used to obtain a horizontal high-pass filtered value with respect to the pixel G33 is applied to the region HM2. A mask used to obtain a horizontal high-pass filtered value with respect to the pixel R34 is applied to the region HM3.

In the same manner, a mask used to obtain a vertical high-pass filtered value with respect to the pixel B23 is applied to the region VM1 among the regions to which the vertical masks are applied in FIG. 3B. A mask used to obtain a vertical high-pass filtered value with respect to the pixel G33 is applied to the region VM2. A mask used to obtain a vertical high-pass filtered value with respect to the pixel B43 is applied to the region VM3.

In FIGS. 3A and 3B, the regions to which the three masks are only applied are shown. However, the calculation of obtaining high-pass filtered values by applying the masks can be performed with respect to all of the pixels of the bayer pattern image.

In order to obtain the high-pass filtered value, each of the pixel values of the pixels included in each of the masks is multiplied by a predetermined high-pass filtering coefficient. Then, values obtained by the multiplications are all added up to thereby the high-pass filtered value of the pixel located at the center of the mask.

Meanwhile, as described above, a green value may be preferably used as a pixel value used to this invention, that is, the pixel value used to perform the high pass-filtering operation. Therefore, when the horizontal and vertical high-pass filtering operations are performed, an estimated green value is determined by obtaining an average of green values of green pixels adjacent to each of the red pixel and the blue pixel, and high-pass filtering can be performed by using the estimated green value.

Referring to FIG. 3A, in order to perform high horizontal high-pass filtering, an estimated green value with respect to the red pixel R32 is determined first. An estimated green value G'32 of the pixel R32 may be determined by an average of values of the pixels G22 and G42 vertically adjacent to the pixel R32. That is, the estimated green value may be determined by "G'32=(G22+G42)/2". In the same manner, an estimated green value with respect to the pixel R34 may be determined by "G'34=(G24+G44)/2". Respective horizontal filtered values HPF_hor1 to HPF_hor3 of the regions HM1 to HM3 to which the horizontal masks are applied are calculated by using the estimated green values according to the following Equation 1.

$$\begin{bmatrix} HPF\_hor1 \\ HPF\_hor2 \\ HPF\_hor3 \end{bmatrix} = \begin{bmatrix} G31 & G'32 & G33 \\ G'32 & G33 & G'34 \\ G33 & G'34 & G35 \end{bmatrix} \begin{bmatrix} h1 \\ h2 \\ h3 \end{bmatrix} \quad \text{[Equation 1]}$$

(where h1 to h3 are predetermined horizontal high-pass filtering coefficients)

In the same way as obtaining the horizontal high-pass filtered value, the vertical high-pass filtered value may be obtained. In FIG. 3B, an estimated green value of G'23 of the blue pixel B23 may be determined by an average of the green pixels G22 and G24 horizontally adjacent to the blue pixel B23. That is, the estimated green value may be determined according to G'23=(G22+G24)/2. In the same manner, an estimated green value with respect to the pixel R34 may be determined according to G'43=(G42+G44)/2. Vertical high-pass filtered values HPF_ver1 to HPF_ver3 of the regions VM1 to VM3, respectively, to which the vertical masks are applied are calculated by using the estimated green values according to the following Equation 2.

$$\begin{bmatrix} HPF\_ver1 \\ HPF\_ver2 \\ HPF\_ver3 \end{bmatrix} = \begin{bmatrix} G13 & G'23 & G33 \\ G'23 & G33 & G'43 \\ G33 & G'43 & G53 \end{bmatrix} \begin{bmatrix} v1 \\ v2 \\ v3 \end{bmatrix} \quad \text{[Equation 2]}$$

(where v1 to v3 are predetermined vertical high-pass filtering coefficients)

As described above, after the high-pass filtering operation (S52) is completed, an operation (S53) of determining whether a target pixel from which color noise is removed is included in a high frequency region. The operation (S53) of determining whether the pixel is included in the high frequency region is performed by comparing pixel values of the target pixel and pixels adjacent to the target pixel with the horizontal and the vertical high-pass filtered values to determine whether the target pixel is included in the high frequency region. The operation (S53) may be performed by the high frequency region determining unit 13 shown in FIG. 1.

Hereinafter, a description will be made of a case in which the bayer pattern images, as shown in FIGS. 3A and 3B, are taken as an example. That is, in the following description, a target pixel from which color noise is removed is the center pixel G33 of the bayer pattern images shown in FIGS. 3A and 3B. Pixels horizontally adjacent to the target pixel are the pixels R32 and R34. The estimated green values 'G'32' and 'G'34' of the respective pixels R32 and R34 may be used for the operation using the pixels horizontally adjacent to the target pixel. In the same manner, pixels vertically adjacent to the target pixel are the pixels B23 and B43. The estimated green values G'23' and G'43 of the pixels B23 and B43 may be used for the calculation using the pixels vertically adjacent to the target pixel. The bayer pattern images, shown in FIGS. 3A and 3B, which are used for the convenience of explanation are only illustrative to understand the noise removing method according to the embodiment of the invention. It is obvious to those skilled in the art that the same method can be applied to bayer pattern images in different forms.

The operation (S53) of determining whether a target pixel is included in a high frequency region starts from an operation (S61) of obtaining first and second error values by subtracting the horizontal high-pass filtered value of the left neighboring pixel G'32 and the horizontal high-pass filtered value of the right neighboring pixel G'34 from pixel values of the left and right neighboring pixels off the target pixel G33, respectively, as shown in S61 of FIG. 6. In the operation S61, the first and second error values HPF_hor_diff1 and HPF_hor_diff2 can be shown as the following Equation 3.

$$\text{HPF\_hor\_diff1} = G'32 - \text{HPF\_hor1} \quad \text{[Equation 3]}$$

$$\text{HPF\_hor\_diff2} = G'34 - \text{HPF\_hor3}$$

Then, it is determined whether the target pixel is included in a high frequency region according to conditions of the first and second error values calculated by Equation 3, the horizontal high-pass filtered values obtained by Equation 1, and the pixel values of the bayer pattern image. A process of determining whether the target pixel is included in the high frequency region according to the conditions of the first and second error values calculated by Equation 3, the horizontal high-pass filtered values obtained by Equation 1, and the pixel values of the bayer pattern image may include first to third frequency region determining operations. The first to third frequency determining operations may be performed by the horizontal high frequency region determining unit 132a of FIG. 4.

First, in the first frequency region determining operation (S62, S63, and S67), when the first error value HPF_hor_diff1 is positive and the second error value HPF_hor_diff2 is negative (S62), and all of the pixel values of the pixels G31, G'32 and G33 included in the horizontal mask with respect to the left neighboring pixel G'32 of the target pixel G33 are larger than the horizontal high-pass filtered value HPF_hor1 of the left neighboring pixel G'32 and all of the pixel values of the pixels G33, G'34, and G35 included in the horizontal mask with respect to the right neighboring pixel G'34 of the target pixel G33 are smaller than the horizontal high-pass filtered value HPF_hor3 of the right neighboring pixel (S63), it can be determined that the target pixel G33 is included in the high frequency region (S67). That is, the first frequency region determining operation is performed to determine that the target pixel is included in the high frequency region when the following Equations 4 and 5 are satisfied.

$$\text{HPF\_hor\_diff1}>0\&\text{HPF\_hor\_diff2}<0 \quad \text{[Equation 4]}$$

$$(G31>\text{HPF\_hor1}\&G'32>\text{HPF\_hor1}\&G33>\text{HPF\_hor1})$$

and $$(G33<\text{HPF\_hor3}\&G'34<\text{HPF\_hor4}\&G35<\text{HPF\_hor3}) \quad \text{[Equation 5]}$$

Next, in the second frequency region determining operation (S64, S65, and S67), when the first error value HPF_hor_diff1 is negative and the second error value HPF_hor_diff2 is positive (S64), and all of the pixel values of the pixels G31, G'32, and G33 included in the horizontal mask with respect to the left neighboring pixel G'32 of the target pixel G33 are smaller than the horizontal high-pass filtered value HPF_hor1 of the left neighboring pixel and all of the pixel values of the pixels G33, G'34, and G35 included in the horizontal mask with respect to the right neighboring pixel G'34 of the target pixel G33 are larger than the horizontal high-pass filtered value HPF_hor3 of the right neighboring pixel (S65), it can be determined that the target pixel is included in the high frequency region (S67). That is, the second high frequency region determining operation is performed to determine that the target pixel is included in the high frequency region when conditions of the following Equations 6 and 7 are satisfied.

$$\text{HPF\_hor\_diff1}<0\&\text{HPF\_hor\_diff2}<0 \quad \text{[Equation 6]}$$

$$(G31<\text{HPF\_hor1}\&G'32<\text{HPF\_hor1}\&G33<\text{HPF\_hor1})$$

and $$(G33>\text{HPF\_hor3}\&G'34>\text{HPF\_hor3}\&G35>\text{HPF\_hor3}) \quad \text{[Equation 7]}$$

Then, the third high frequency region determining operation (S66 and S67), when all of the first and second error values HPF_hor_diff1 and HPF_hor_diff2 are positive or negative, and all of the pixel values of the pixels G'32, G33, and G'34 included in the horizontal mask with respect to the target pixel G33 are smaller or larger than the horizontal high-pass filtered value HPF_hor2 of the target pixel G33 (S66), it can be determined that the target pixel G33 is included in the high frequency region (S67). That is, when the first and second error values HPF_hor_diff1 and HPF_hor_diff2 do not satisfy the conditions of S62 and S64 in the first and second high frequency region determining operations, if conditions of the following Equation 8 are satisfied, the third high frequency region determining operation is performed to determine that the target pixel is included in the high frequency region.

$$(G'32<\text{HPF\_hor2}\&G33<\text{HPF\_hor2}\&G'32<\text{HPF\_hor2})$$

or $$(G'32>\text{HPF\_hor2}\&G33>\text{HPF\_hor2}\&G'34>\text{HPF\_hor2}) \quad \text{[Equation 8]}$$

When the conditions are not satisfied, it is determined that the target pixel G33 is not included in the high frequency region. The target pixel may bypass a color noise region determining operation (S55) and a color noise removing operation (S56) to be followed (S68).

Then, as shown in FIG. 7, the operation (S53) of determining whether a target pixel is included in a high frequency region may include an operation (S71) of obtaining third and fourth error values HPF_ver_diff1 and HPF_ver_diff2, a fourth high frequency region determining operation (S72, S73, and S77), a fifth high frequency region determining operation (S74, S75, and S77), and a sixth high frequency region determining operation (S76 and S77). The operation (S71) of calculating third and fourth error values HPF_ver_diff1 and HPF_ver_diff2 may be performed by the error value calculating unit 131 of FIG. 4. The fourth to sixth high frequency region determining operations may be performed by the vertical high frequency region determining unit 132b.

The operation of obtaining the third and fourth error values and the fourth to sixth high frequency region determining operations are substantially identical to the above-described operation of obtaining the first and second error values and the above-described first to third high frequency region determining operations except for a direction in which calculations are applied. Therefore, a detailed description thereof will be omitted because those skilled in the art can easily understand the operation of obtaining the third and fourth error values and the fourth to sixth high frequency region determining operations with reference to the descriptions of the operation of obtaining the first and second error values and the first to third high frequency region determining operations, and FIG. 7.

As such, in the embodiment of the invention, the high frequency region is determined by using a difference between an original image and an image generated by a high-pass filter to emphasize high frequency characteristics of the image. In this way, according to the embodiment of the invention, it is possible to extract clear outline components, such as the contour of the subject or the boundary of the pattern.

As described above, when it is determined that the target pixel is included in the high frequency region as the result of an operation (S54) of determining that the target pixel is included in the high frequency region after the operation (S53) of determining whether the target pixel is included in the high frequency region, an operation (S55) of determining whether the target pixel is included in a color noise region by using differences between color values of the target pixel interpolated by the color interpolation unit is performed.

The operation (S55) of determining whether the target pixel is included in a color noise region is an operation (S81) as shown in FIG. 8. In the operation (S81), among the color values generated by performing the above-described color interpolation on the target pixel determined that it is included in the color noise region, a difference between the green value G and the blue value B and a difference between the green value G and the red value R are compared with a predetermined color noise determination threshold value Gray_th, and when the difference between the green value G and the blue value B and the difference between the green value G and the red value R are smaller than the predetermined color noise determination threshold value Gray_th, it is determined that the corresponding pixel is included in the color noise region. The predetermined color noise determination threshold value Gray_th is a reference value used to determine whether color appearing in the high frequency region is color noise or not. When the difference between the color values of the pixel determined that it is included in the high frequency region exceeds a predetermined level, the operation (S81) is performed to determine that the color noise, that is, predetermined color is particularly distinctive during the color interpolation.

Finally, when it is determined that the target pixel is included in the color noise region, an operation (S56 and S82) of replacing the red value and the blue value of the target pixel with the green value of the target pixel is performed. In general, the pixel whose color values are determined by color interpolation has a red value, a green value, and a blue value with a range of 0 to 255. When it is determined that the target pixel is included in the color noise region, each of the red value and the blue value among the color values generated by performing the color interpolation of the target pixel is replaced with the green value of the target pixel. In this way, the pixel determined that it is included in the color noise region is corrected into an achromatic color pixel of which red, green, and blue values are the same values, such that a color noise component is removed.

As described above, the color noise removing technique according to the related art removes color noise of an image by correcting a color interpolation process itself. Therefore, in order to remove color noise, the entire color interpolation algorithm needs to be corrected, which results in color noise reduction rather than color noise removal. In comparison, the present invention recognizes a high frequency region by using a bayer pattern image before color interpolation and determines a color noise component. Since the present invention uses images before and after color interpolation for the color noise removing technique, the color interpolation algorithm does not need to be corrected to prevent color noise. Further, since color values of a pixel determined as color noise are directly changed to thereby obtain an achromatic color pixel, the color noise can be completely removed.

Further, the color noise removing technique according to the embodiment of the invention uses a high-pass filter in order to recognize a high frequency region of an image. Since the high-pass filter makes a high frequency component of an input signal more distinguished, it becomes easier to analyze the high frequency component inside the image. Further, since a difference between a result obtained by the high-pass filter and an original image are compared with each other and a high frequency region is determined by using the difference, the present invention can be applied to a portion having a small difference between green and blue and a small difference between green and red in the contour of a subject and the boundary of a pattern. Therefore, when removing color noise existing in the boundary of an achromatic color subject, the color noise can be effectively removed without removing color existing in the image.

As set forth above, according to exemplary embodiments of the invention, independent of a color interpolation algorithm, it is determined whether color noise occurs in a bayer pattern image output from an image sensor, and an interpolated image is corrected to remove the color noise, such that the color noise can be effectively removed without additionally changing an algorithm even though the color interpolation algorithm is changed. Further, since the color interpolation algorithm and the color noise removal algorithm are separated from each other, the color interpolation algorithm can be developed without taking color noise suppression into account when correcting or developing the color interpolation algorithm.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for removing color noise comprising:
  a color interpolation unit performing color interpolation on a bayer pattern image output from an image sensor to determine color values of respective pixels;
  a high-pass filter unit performing high-pass filtering on each of the pixels of the bayer pattern image in a horizontal direction and a vertical direction to generate a horizontal high-pass filtered value of each of the pixels of the bayer pattern image and a vertical high-pass filtered value of each of the pixels of the bayer pattern image;
  a high frequency region determining unit comparing pixel values of a target pixel, from which color noise is removed, and pixels adjacent to the target pixel with the horizontal and vertical high-pass filtered values to determine whether the target pixel is included in a high frequency region;
  a color noise region determining unit using differences between color values of the target pixel interpolated by the color interpolation unit and determining whether the target pixel is included in a color noise region when it is determined that the target pixel is included in the high frequency region; and
  a color noise removing unit replacing a color value and a blue value of the target pixel with a green value of the target pixel when it is determined that the target pixel is included in the color noise region.

2. The apparatus of claim 1, wherein the high-pass filter unit comprises:

a horizontal high-pass filter unit applying a horizontal mask having a high-pass filtering coefficient to pixels arranged horizontally with respect to each of the pixels of the bayer pattern image to generate the horizontal high-pass filtered value of each of the pixels of the bayer pattern image; and a vertical high-pass filter unit applying a vertical mask having a high-pass filtering coefficient to pixels arranged vertically with respect to each of the pixels of the bayer pattern image to generate the vertical high-pass filtered value of each of the pixels of the bayer pattern image.

3. The apparatus of claim 2, wherein the horizontal high-pass filter unit determines an average of green pixels vertically adjacent to each of red and blue pixels of the bayer pattern image as a first estimated green value of each of the red and blue pixels of the bayer pattern image and generates the horizontal high-pass filtered value by using a green value of each of the pixels of the bayer pattern image and the first estimated green value, and the vertical high-pass filter unit determines an average of green pixels horizontally adjacent to each of the red and blue pixels of the bayer pattern image as a second estimated green value and generates the vertical high-pass filtered value by using the green value of each of the pixels of the bayer pattern image and the second estimated green value.

4. The apparatus of claim 1, wherein the high frequency region determining unit comprises:

an error value calculating unit obtaining first and second error values by subtracting the horizontal high-pass filtered value of a left neighboring pixel of the target pixel and the horizontal high-pass filtered value of a right neighboring pixel of the target value from pixel values of the left and right neighboring pixels, respectively, of the target value and obtaining third and fourth error values by subtracting the vertical high-pass filtered value of an upper neighboring pixel of the target pixel and the vertical high-pass filtered value of a lower neighboring pixel of the target value from pixel values of the upper and lower neighboring pixels of the target value, respectively;

a horizontal high frequency region determining unit determining that the target pixel is included in the high frequency region when the first error value is positive and the second error value is negative, pixel values of pixels included in the horizontal mask with respect to the left neighboring pixel of the target pixel are all larger than the horizontal high-pass filtered value of the left neighboring pixel, and pixel values of pixels included in the horizontal mask with respect to the right neighboring pixel of the target pixel are all smaller than the horizontal high-pass filtered value of the right neighboring pixel, the horizontal high frequency region determining that the target pixel is included in the high frequency region when the first error value is negative and the second error value is positive, all of the pixel values of the pixels included in the horizontal mask with respect to the left neighboring pixel of the target pixel are smaller than the horizontal high-pass filtered value of the left neighboring pixel, and all of the pixel values of the pixels included in the horizontal mask with respect to the right neighboring pixel of the target pixel are larger than the horizontal high-pass filtered value of the right neighboring pixel, the horizontal high frequency region determining that the target pixel is included in the high frequency region when all of the first and second error values are positive or negative and all of the pixel values of the pixels included in the horizontal mask with respect to the target pixel are smaller or larger than the horizontal high-pass filtered value of the target pixel; and a vertical high frequency region determining unit determining that the target pixel is included in the high frequency region when the third error value is positive and the fourth error value is negative, all of the pixel values of the pixels included in the vertical mask with respect to the upper neighboring pixel of the target pixel are larger than the vertical high-pass filtered value of the upper neighboring pixel, all of the pixel values of the pixels included in the vertical mask with respect to the lower neighboring pixel of the target pixel are smaller than the vertical high-pass filtered value of the lower neighboring pixel, the vertical high frequency region determining that the target pixel is included in the high frequency region when the third error value is negative and the fourth error value is positive, all of the pixel values of the pixels included in the vertical mask with respect to the upper neighboring pixel of the target pixel are smaller than the vertical high-pass filtered value of the upper neighboring pixel, and all of the pixel values of the pixels included in the vertical mask with respect to the lower neighboring pixel of the target pixel are larger than the vertical high-pass filtered value of the lower neighboring pixel, the vertical high frequency region determining that the target pixel is included in the high frequency region when all of the third and fourth error values are positive or negative and all of the pixel values of pixels included in the vertical mask with respect to the target pixel are smaller or larger than the vertical high-pass filtered value of the target pixel.

5. The apparatus of claim 4, wherein for the pixel values used by the error value calculating unit to calculate the first and second error values and the pixel values used by the horizontal high frequency determining unit to determine the high frequency region, green values of the green pixels are applied to the green pixels of the bayer pattern image and the average of the green pixels vertically adjacent to each of the red and blue pixels of the bayer pattern image is applied to each of the red and blue pixels, and for the pixel values used by the error value calculating unit to calculate the third and fourth error values and the pixel values used by the vertical high frequency determining unit to determine the high frequency region, the green values of the green pixels are applied to the green pixels of the bayer pattern image and the average of the green pixels horizontally adjacent to each of the red and blue pixels is applied to each of the red and blue pixels of the bayer pattern image.

6. The apparatus of claim 1, wherein the color noise region determining unit determines that the corresponding pixel is included in the color noise region when a difference between the green value and the blue value and a difference between the green value and the red value among the color values generated by causing the color interpolation unit to perform color interpolation on the pixel determined by the high frequency region determining unit that it is included in the high frequency region are smaller than a predetermined color noise determination threshold value.

7. A method of removing color noise in a digital image, the method comprising:

performing color interpolation on a bayer pattern image output from an image sensor to determine color values of respective pixels;

performing high-pass filtering on each of the pixels of the bayer pattern image in a horizontal direction and a vertical direction to generate a horizontal high-pass filtered value of each of the pixels of the bayer pattern image and a vertical high-pass filtered value of each of the pixels of the bayer pattern image;

comparing pixel values of a target pixel, from which color noise is removed, and pixels adjacent to the target pixel and determining whether the target pixel is included in a high frequency region;

using differences between the color values of the target pixel interpolated by the color interpolation unit and determining whether the target pixel is included in a color noise region when it is determined that the target pixel is included in the high frequency region; and replacing a red value and a blue value of the target pixel with a green value of the target pixel when it is determined that the target pixel is included in a color noise region.

8. The method of claim 7, wherein the performing high-pass filtering comprises:

generating the horizontal high-pass filtered value of each of the pixels of the bayer pattern image by applying a horizontal mask having a high-pass filtering coefficient to pixels arranged horizontally with respect to each of the pixels of the bayer pattern image; and generating the vertical high-pass filtered value of each of the pixels of the bayer pattern image by applying a vertical mask having a high-pass filtering coefficient to pixels arranged vertically with respect to each of the pixels of the bayer pattern image.

9. The method of claim 8, wherein the generating the horizontal high-pass filtered value comprises determining an average of green pixels vertically adjacent to each of red and blue pixels of the bayer pattern image as a first estimated green value of each of the red and blue pixels and generating the horizontal high-pass filtered value by using a green value of each of the pixels of the bayer pattern image and the first estimated green value, and the generating the vertical high-pass filtered value comprises determining an average value of green pixels horizontally adjacent to each of the red and blue pixels of the bayer pattern image as a second estimated green value of each of the red and blue pixels and generating the vertical high-pass filtered value by using the green value of each of the pixels and the second estimated green value.

10. The method of claim 7, wherein the determining whether the target pixel is included in a high frequency region comprises:

obtaining first and second error values by subtracting the horizontal high-pass filtered value of a left neighboring pixel and the horizontal high-pass filtered value of a right neighboring pixel of the target pixel from pixel values of the left and right neighboring pixels of the target value, respectively;

determining that the target pixel is included in the high frequency region when the first error value is positive and the second error value is negative, pixel values of pixels included in the horizontal mask with respect to the left neighboring pixel of the target pixel are all larger than the horizontal high-pass filtered value of the left neighboring pixel, and pixel values of pixels included in the horizontal mask with respect to the right neighboring pixel of the target pixel are all smaller than the horizontal high-pass filtered value of the right neighboring pixel (a first high frequency region determining operation);

determining that the target pixel is included in the high frequency region when the first error value is negative and the second error value is positive, all of the pixel values of the pixels included in the horizontal mask with respect to the left neighboring pixel of the target pixel are smaller than the horizontal high-pass filtered value of the left neighboring pixel, and all of the pixel values of the pixels included in the horizontal mask with respect to the right neighboring pixel of the target pixel are larger than the horizontal high-pass filtered value of the right neighboring pixel (a second high frequency region determining operation);

determining that the target pixel is included in the high frequency region when all of the first and second error values are positive or negative and all of the pixel values of the pixels included in the horizontal mask with respect to the target pixel are smaller or larger than the horizontal high-pass filtered value of the target pixel (a third high frequency region determining operation);

obtaining third and fourth error values by subtracting the vertical high-pass filtered value of an upper neighboring pixel and the vertical high-pass filtered value of a lower neighboring pixel of the target pixel from pixel values of the upper and lower neighboring pixels of the target value, respectively;

determining that the target pixel is included in the high frequency region when the third error value is positive and the fourth error value is negative, pixel values of pixels included in the vertical mask with respect to the upper neighboring pixel of the target pixel are all larger than the vertical high-pass filtered value of the upper neighboring pixel, and pixel values of pixels included in the vertical mask with respect to the lower neighboring pixel of the target pixel are all smaller than the vertical high-pass filtered value of the lower neighboring pixel (a fourth high frequency region determining operation);

determining that the target pixel is included in the high frequency region when the third error value is negative and the fourth error value is positive, all of the pixel values of pixels included in the vertical mask with respect to the upper neighboring pixel of the target pixel are smaller than the vertical high-pass filtered value of the upper neighboring pixel, and all of the pixel values of the pixels included in the vertical mask with respect to the lower neighboring pixel of the target pixel are larger than the vertical high-pass filtered value of the lower neighboring pixel (a fifth high frequency region determining operation); and determining that the target pixel is included in the high frequency region when all of the third and fourth error values are positive or negative and all of the pixel values of the pixels included in the vertical mask with respect to the target pixel are smaller or larger than the vertical high-pass filtered value of the target pixel (a sixth high frequency determining operation).

11. The method of claim 10, wherein for the pixel values used to calculate the first and second error values and the pixel values used in the first to third high frequency region determining operations, green values of the green pixels are applied to the green pixels of the bayer pattern image and the average of the green pixels vertically adjacent to each of red and blue pixels of the bayer pattern image is applied to each of the red and blue pixels, and for the pixel values used to calculate the third and fourth error values and the pixel values used in the fourth to sixth high frequency region determining operations, the green values of the green pixels are applied to the green pixels of the bayer pattern image and the average of the green pixels horizontally adjacent to each of the red and blue pixels is applied to each of the red and blue pixels of the bayer pattern image.

12. The method of claim 7, wherein the determining whether the target pixel is included in a color noise region comprises:

comparing a predetermined color noise determination threshold value with a difference between the green value and the blue value and a difference between the green value and the red value among the color values generated by performing color interpolation on the pixel in the determining whether the target pixel is included, the pixel determined that it is included in the high frequency region in the determining whether the target pixel is included in a high frequency region, and determining that the corresponding pixel is included in the color noise region when the difference between the green value and the blue value and the difference between the green value and the red value are smaller than the color noise determination threshold value.

* * * * *